UNITED STATES PATENT OFFICE.

CARL STRAUB, OF SYRACUSE, NEW YORK.

COMPOSITION OF MATTER FOR CEMENT, &c.

SPECIFICATION forming part of Letters Patent No. 407,135, dated July 16, 1889.

Application filed October 20, 1887. Serial No. 252,884. (No specimens.)

*To all whom it may concern:*

Be it known that I, CARL STRAUB, of Syracuse, in the county of Onondaga and State of New York, have invented a new and useful Composition of Matter for use in Connection with Land-Plaster in the Manufacture of Cement, Artificial Stone, &c., of which the following is a specification.

This invention relates to a composition of matter by the use of which gypsum deposits of the character found in large quantities in the counties of Onondaga and Cayuga, in the State of New York, and known as "land-plaster," may be utilized for the purpose of making cement, artificial stone, wall-covering, &c., said deposits having heretofore been used only for fertilizing purposes.

In preparing my composition I take one part of acid, preferably sulphuric or muriatic acid, and add thereto four parts of any proper material for retarding the action of the acid, which material may be glue or oil, either vegetable, animal, or mineral, or a combination of glue and oil. To this solution I add about fifteen parts of water, and then add a composition consisting of ten parts of any calcined calcareous base—such, for instance, as plaster-of-paris—and one part of silicate of potash or natron, mixing so much of the last-described composition with the mixture of acid, its retarder, and water as will make a thick pasty mass, after which the material is allowed to stand and dry. After drying the material is pulverized and mixed with calcined land-plaster, ten to twenty parts of the land-plaster being used to one part of the composition above described.

In using the material compounded as above described, water is added in the usual manner, and it is applied as ordinary plaster, or it may be cast in molds and allowed to indurate, thus forming a good artificial stone or marble.

If the land-plaster contains a large percentage of gypsum, the amount of silicate of potash or natron could be materially reduced, and in some cases such potash or natron could be entirely omitted.

Having thus fully described my invention, I claim as new and desire to secure by Letters Patent—

1. The herein-described composition of matter, consisting of acid, a retarder, as glue or oil, a calcined calcareous base, as plaster-of-paris, and silicate of potash or natron, combined substantially in the proportions specified.

2. The herein-described composition of matter, consisting of sulphuric or muriatic acid, an acid retarder, as glue or oil, calcined calcareous base, as plaster-of-paris, silicate of potash, and land-plaster, in about the proportions specified.

CARL STRAUB.

Witnesses:
EDWARD KENT, Jr.,
EDGAR TATE.